United States Patent
Smith

(12) United States Patent (10) Patent No.: US 6,203,924 B1
(45) Date of Patent: Mar. 20, 2001

(54) LIGHTWEIGHT FLYWHEEL CONTAINMENT

(75) Inventor: James R. Smith, Livermore, CA (US)

(73) Assignee: The Regents of the University of Californaia, Oakland, CA (US)

( * ) Notice: Subject to any disclaimer, the term of this patent is extended or adjusted under 35 U.S.C. 154(b) by 0 days.

(21) Appl. No.: 09/028,844

(22) Filed: Feb. 24, 1998

(51) Int. Cl.[7] ....................................................... B32B 1/06
(52) U.S. Cl. ........................ 428/593; 428/116; 428/66.6; 74/572
(58) Field of Search .................................... 428/66.6, 116, 428/593; 74/572

(56) References Cited

U.S. PATENT DOCUMENTS 5,387,451 * 2/1995 Miller ...................................... 428/65

* cited by examiner

*Primary Examiner*—Alexander S. Thomas
(74) *Attorney, Agent, or Firm*—Alan H. Thompson; L. E. Carnahan

(57) ABSTRACT

A lightweight flywheel containment composed of a combination of layers of various material which absorb the energy of a flywheel structural failure. The various layers of material act as a vacuum barrier, momentum spreader, energy absorber, and reaction plate. The flywheel containment structure has been experimentally demonstrated to contain carbon fiber fragments with a velocity of 1,000 m/s and has an aerial density of less than 6.5 g/square centimeters. The flywheel containment, may for example, be composed of an inner high toughness structural layer, and energy absorbing layer, and an outer support layer. Optionally, a layer of impedance matching material may be utilized intermediate the flywheel rotor and the inner high toughness layer.

9 Claims, 1 Drawing Sheet

LIGHTWEIGHT FLYWHEEL CONTAINMENT

The United States Government has rights in this invention pursuant to Contract No. W-7405-ENG48 between the United States Department of Energy and the University of California for the operation of Lawrence Livermore National Laboratory.

BACKGROUND OF THE INVENTION

The present invention relates to high speed flywheels, particular to a means containing fragments of flywheels undergoing structural failure, and more particularly to a lightweight flywheel containment structure composed of a plurality of layers of different materials.

High speed flywheels are being developed for a variety of applications, and such flywheels typically have rotational speeds of 20,000 to 100,000 rpm. Structural failure of a flywheel rotating at such speed cause damage to surrounding equipment due to the fragments being thrown from the rotating flywheel. Such fragments may have sufficient mass and speed so as to present a lethal hazard to persons in the area. Rim speeds of the rotors range from 500 to 1,200 m/s. The typical high speed flywheels are composed of high strength carbon fiber composites, and thus structural failure of such flywheels rotating at high speeds produces high speed fragments, which has been a major concern in this developing technology.

Prior efforts have been directed to the development of containment structures for flywheels, which include containment housings in which the flywheels rotate, and heavy containment structures which surround the flywheel. However, heavy containment structures surrounding the flywheel increase the weight of the flywheel assembly and thus decreases the efficiency thereof. Such high weight containment structures reduce the benefit of the power peaking capability of flywheels for mobile applications, for example, such as hybrid vehicles, automobiles, trucks, buses, and trains. Thus, there has been a need for a means by which structural flywheel failure can be contained without the need of encasements or containments which prevent power peaking.

The present invention provides a solution to the above-referenced problems relating to high speed flywheels, by providing a structure encasing or surrounding the flywheel which is capable of containing fragments due to flywheel failure, while using materials having a structural weight that is not excessive and thus does not reduce the benefit of the power peaking capability of flywheels. The lightweight flywheel containment of the present invention utilizes of plurality of layers of different material which act as a vacuum barrier, momentum spreader, energy absorbers, and reaction plate. The lightweight flywheel containment can be utilized on high speed flywheels having stationary applications as well as mobile applications for power peaking.

SUMMARY OF THE INVENTION

It is an object of the present invention to absorb the energy of a flywheel structural failure.

A further object of the invention is to contain high speed fragments resulting from flywheel structural failure.

A further object of the invention is to provide a lightweight flywheel containment.

Another object of the invention is to provide a lightweight flywheel containment encasing the flywheel and composed of a plurality of layers of various materials.

Another object of the invention is to provide a lightweight flywheel containment which includes an inner high toughness structural layer, an energy absorbing layer, and an outer support layer, which may be positioned around the flywheel rotor, or optionally spaced from the rotor through a layer impedance matching material.

Another object of the invention is to provide a lightweight flywheel containment structure composed of a combination of materials in various layers of material which act as a vacuum barrier, momentum spreader, energy absorber, and reaction plate.

Other objects and advantages of the present invention will become apparent from the following description and accompanying drawings. The invention is directed to a lightweight flywheel containment for high speed flywheels capable of operating in the 20,000 to 100,000 rpm range. The flywheel containment is composed of a combination of materials arranged in such a way as to absorb the energy of a flywheel failure. The flywheel containment includes various layers of material which act as a vacuum barrier, momentum spreader, energy absorber, and reaction plate. Due to the structural arrangement and the lightweight of the flywheel containment, it can be utilized in stationary applications and in mobile applications for power peaking. An embodiment of the flywheel containment is composed of an inner high toughness structural layer, an energy absorbing layer, and an outer support layer, with the inner layer being encased about the flywheel rotor or spaced from the rotor by a layer of impedance matching material. The lightweight containment structure can be utilized with flywheel rotors operating at rim speeds of 500–1,200 m/s, and the tests have shown that the containment structure is capable of containing fragments resulting from high speed structural failure.

BRIEF DESCRIPTION OF THE DRAWINGS

The accompanying drawing, which is incorporated into and forms a part of the disclosure, illustrates an embodiment of the invention and, together with the description, serves to explain the principles of the invention.

DETAILED DESCRIPTION OF THE INVENTION

The present invention involves a lightweight flywheel containment capable of fully containing high speed fragments of a flywheel caused by structural failure. Due to the layered construction of the flywheel containment and the types of materials used therein the structure is capable of fully containing these fragments using a structural weight that does not reduce the benefit of power peaking capability of flywheels for mobile applications. The lightweight flywheel containment uses a combination of materials arranged in such a way as to absorb the energy of a high speed flywheel structure failure. The various layers of material act as a vacuum barrier, momentum spreader, energy absorber, and reaction plate. The lightweight containment structure has been experimentally demonstrated to contain carbon fiber fragments with a velocity of 1,000 m/s and has an aerial density of less than 6.5 g/square centimeter. The lightweight flywheel containment of the present invention has the potential for containment of high speed flywheels, for both stationary and mobile applications. Due to the construction of the flywheel containment, the weight penalty is not as severe, and thus there is no reduction for power peaking as desired for mobile applications, and thus may be used for hybrid vehicles, automobiles, trucks, buses, and trains.

As pointed out above, high speed flywheels operate at 20,000 to 100,000 rpm, and the rim speeds of the rotors range from 500 to 1,200 ms, and thus containment of fragments upon flywheel structure failure is essential, since these fragments have sufficient mass and speed to present a lethal hazard.

Figure 1:
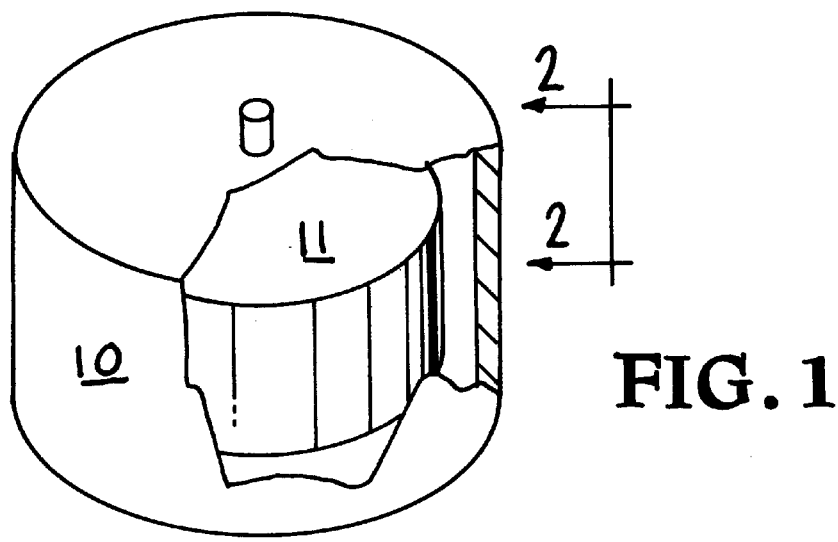
FIG. 1 illustrates a flywheel rotor encased in a containment case.
Figure 2:
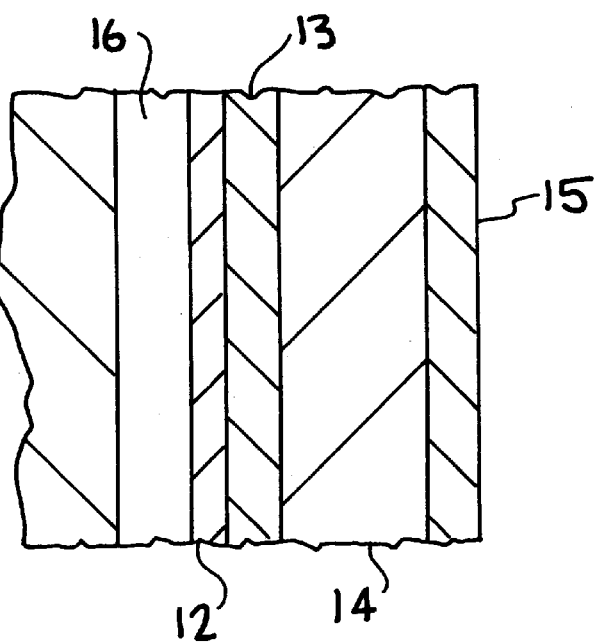
FIG. 2 illustrates a section of an embodiment of a lightweight flywheel containment of FIG. 1, made in accordance with the present invention.

The lightweight flywheel structure of the present invention comprises three, or optionally four, layers of material, as illustrated in the drawing. As shown in FIGS. 1 and 2, a containment structure or case, generally indicated at 10 is encased to a flywheel rotor 11, with the illustrated embodiment of the containment structure 10 comprising, a layer 12 of impedance matching material, a high toughness structural layer 13, an energy absorbing layer 14, and a outer support layer 15. A space 16 between impedance layer 12 and rotor 11 may be a vacuum or air space.

The impedance matching material layer 12 is optional and is composed of material that matches the mechanical impedance of fragments of the rotor 11, and is added to the containment structure 10 to reduce momentum transfer to the layers 13, 14, and 15 of the containment structure 10. Mechanical impedance is the product of material sound speed and the material density. Carbon fiber composites or a number of high density plastics, such as high density polyethylene or glass load polyethersulfone, can be used for the impedance matching layer 12. The layer 12 should be at least one-half the thickness of the radial thickness of the flywheel fragments to be most effective. For example, the layer 12 may have a thickness of 1 to 2 cm.

The first or inner structural layer 13 is composed of a high toughness material, such as austenitic stainless steels (i.e., SS304 and SS316), moderate heat treated low alloy steel such as 4130, or armor plate steel such as Heflin REM500. The layer 13 distributes the momentum of the flywheel fragments over a larger area and thus prevents puncture of the first structural layer. Experiments have shown that a 3 mm thickness of SS304 is adequate for this layer for rim speeds of 700 m/s and carbon composite fragments of 50 mm thickness. Tests have also shown that 3 mm of high hardness armor (Heflin REM500) will stop 950 m/s fragments of 50 mm length. Thus, layer 13 may typically have a thickness of 3 to 6 mm, depending on the composition of the material thereof and the expected size of the flywheel fragments.

The second or intermediate structural layer 14 of containment structure 10 is composed of an energy absorbing material such as high density, aluminum honeycomb, Kevlar, or carbon composite honeycomb. The layer 14 may be from 25 to 75 mm thick. Experiments have demonstrated that a 50 mm thickness of 38 lb/ft$^3$ aluminum honeycomb serves to support the inner structural layer 13 and absorb the kinetic energy of the flywheel fragments. Composite honeycomb-like structures, made of Kevlar or carbon epoxy composite could also be used for the energy absorbing layer 14 resulting in lighter weight structures.

The outer support layer 15 of containment structure 10 is composed of a lightweight material used to support the energy absorbing (honeycomb) layer 14, and may consist of aluminum, magnesium, titanium, or beryllium, having a thickness of 3 to 6 mm. Experiments have demonstrated that 3 mm of 6061-T6 aluminum having a thickness of 3 mm, is adequate. Also, higher strength materials such as fiber glass, carbon composites, or beryllium could be used.

By way of example, if the impedance matching layer 12 is utilized, it may be attached to the high toughness structural layer 13 as by bonding (i.e., glued). The high toughness structural layer 13 is attached to layer 12 such as by bonding, and the energy absorbing layer 14 is attached to layer 13 such as by bonding and outer support layer 15 is attached to layer 14, such as by bonding. The three layers 13, 14, and 15 may be held in place by an interference fit. Where the optional impedance matching material layer 12 is omitted, the structural layer 13 is spaced from flywheel rotor 11. It is understood that the three layer (layers 13, 14, 15) containment structure, or a four layer (layers 12–15) containment structure can be prefabricated as a composite structure to encase or surround the flywheel rotor 11 in accordance with conventional technology.

Figure 3:
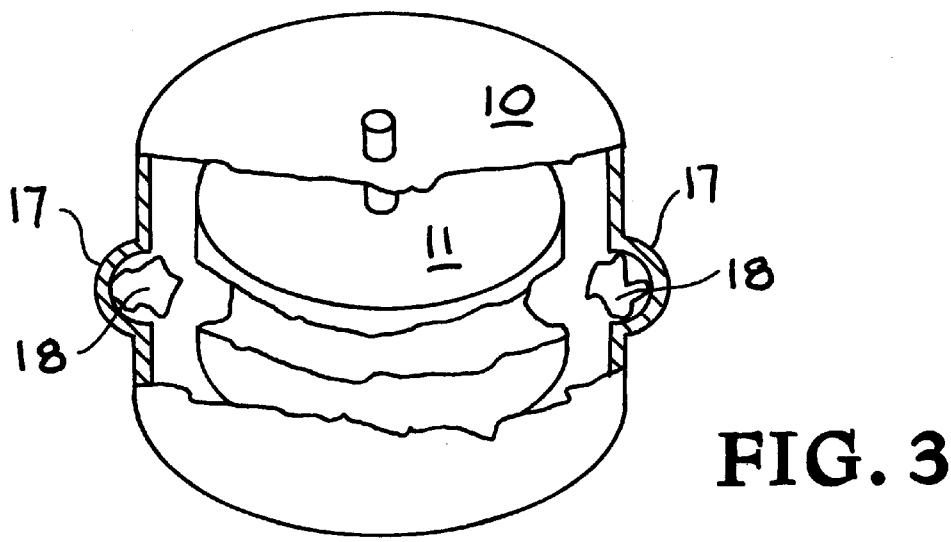
FIG. 3 illustrates the containment case of FIG. 1 after a flywheel rotor failure.

FIG. 3 illustrates a deformed containment case 10 after a flywheel rotor 11 failure. The deformations 17 caused by the high speed swirling fragments from rotor 11 form a "groove" which will trap debris 18. This significantly reduces axial loads on the containment case preventing rupture thereof.

It has thus been shown that the present invention provides a lightweight flywheel containment, particularly adapted for high speed flywheels, which has the capability of containing fragments produced by flywheel structure failure, while being composed of lightweight material thereby minimizing the reduction of the benefit of the power peaking capability of high speed flywheels for mobile applications. The containment structure of the present invention has been experimentally shown to contain carbon fiber fragments with a velocity of 1,000 m/s, and has an aerial density of less than 6.5 g/square centimeter. Thus, the lightweight flywheel containment of the present invention can be utilized for stationary applications, and in mobile applications for power peaking. Due to the layered construction and the various materials utilized the containment structure acts as a vacuum barrier, momentum spreader, energy absorber, and reaction plate.

While a particular embodiment, with the optional impedance matching layer, has been illustrated and described, along with specific materials and parameters, to exemplify and teach the principles of the invention, such are not intended to be limiting. Modifications and changes may become apparent to those skilled in the art, and it is intended that the invention be limited only by the scope of the appended claims.

What is claimed is:

1. A combination of flywheel and containment structure therefor, said containment structure consisting of three radially positioned layers comprising:

a structural layer;

an energy absorbing layer, and a support layer.

2. The combination of claim 1, wherein said structural layer is composed of material having high toughness.

3. The combination of claim 2, wherein said material having high toughness is selected from the group consisting of austenitic stainless steels, moderate heat treated low alloy steels, and high hardness armor plate.

4. The combination of claim 1, wherein said energy absorbing layer is composed of material selected from the group consisting of aluminum honeycomb, composite honeycomb-like structure, and Kevlar composite honeycomb-like structure.

5. The combination of claim 1, wherein said support layer is composed of material selected from the group of aluminum, fiberglass, carbon composites, beryllium, magnesium and titanium.

6. The combination of claim 1, wherein said containment structure has a low weight to maximize the benefit of the power peaking capability of flywheels for mobile applications.

7. A combination of flywheel and containment structure therefore, said containment structure including:
   a structural layer composed of material having high toughness;
   an energy absorbing layer;
   a support layer; and
   a layer of impedance matching material intermediate said structural layer and said flywheel,
   said layer of impedance matching material being constructed of material that matches the mechanical impedance of rotor fragments of said flywheel.

8. The combination of claim 2, wherein said impedance matching material is selected from the group consisting of carbon fiber composites, high density polyethylene plastics, and glass loaded polyethersulfone.

9. The combination of claim 7, wherein said layer of impedance matching material has a thickness of at least one-half the radial thickness of rotor fragments from said flywheel caused by structural failure of said flywheel.

* * * * *